(12) United States Patent
Otte et al.

(10) Patent No.: US 8,803,463 B2
(45) Date of Patent: Aug. 12, 2014

(54) METHOD FOR MOVING AN ELEMENT, WHICH IS DRIVEN BY AN ELECTRIC MOTOR INSIDE A PREDETERMINED MOVEMENT SECTION BETWEEN TWO BLOCK POSITIONS EACH FORMED AS A LIMIT STOP, INTO A BLOCK POSITION

(71) Applicant: Leopold Kostal GmbH & Co. KG, Luedenscheid (DE)

(72) Inventors: Stefan Otte, Sprockhovel (DE); Matthias Steinbach, Dortmund (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 0 days.

(21) Appl. No.: 13/680,192

(22) Filed: Nov. 19, 2012

(65) Prior Publication Data
US 2013/0154532 A1 Jun. 20, 2013

Related U.S. Application Data

(63) Continuation of application No. PCT/EP2011/057999, filed on May 17, 2011.

(30) Foreign Application Priority Data

May 19, 2010 (DE) .................. 10 2010 021 080

(51) Int. Cl.
*H02P 3/00* (2006.01)
*H02P 7/29* (2006.01)
*H02P 3/06* (2006.01)
*E05F 15/16* (2006.01)
*H02P 7/00* (2006.01)
*H02P 3/08* (2006.01)

(52) U.S. Cl.
CPC .. *H02P 3/06* (2013.01); *H02P 7/29* (2013.01); *E05Y 2400/354* (2013.01); *E05Y 2400/336* (2013.01); *E05Y 2400/36* (2013.01); *E05Y 2900/55* (2013.01); *E05F 15/1684* (2013.01); *E05Y 2800/74* (2013.01); *E05Y 2800/73* (2013.01); *H02P 7/0094* (2013.01); *H02P 3/08* (2013.01)
USPC ............ 318/466; 318/671; 318/626; 318/599

(58) Field of Classification Search
CPC .......... H02H 7/0851; E05Y 2900/106; E05Y 2900/55; E05F 15/1607; E05F 15/0004; B60J 7/0573; G05D 3/122; G05D 3/16; G05D 3/1427; G05D 3/1418; G05D 3/127; G05D 3/18; G05B 2219/45187; G05B 11/28; G05B 2219/42237; G05B 2219/45242; G05B 2219/37019; B60R 1/072; B60R 16/005; B66F 9/20; F16F 9/462; G01D 3/02; H01H 1/54; H01H 51/005; H01H 89/06; H02P 1/18; H02P 7/29; H02P 6/085; B60L 15/32; H02K 41/031; H02K 49/046; H02K 49/065; H02K 49/10; H02K 2201/18; B23Q 15/26; F15B 2211/328; H03K 7/08; B60H 1/00835; H05B 41/3927
USPC .......... 318/156, 74, 671, 552, 554, 555, 162, 318/163, 266, 286, 599, 626, 466, 701, 318/400.02, 400.28, 685, 468, 687, 38, 127, 318/128, 520, 635, 282; 361/144, 206, 160; 123/399, 478; 251/129.04; 280/806; 71/10.1; 239/585.5; 701/49, 36
See application file for complete search history.

(56) References Cited

U.S. PATENT DOCUMENTS

| | | | |
|---|---|---|---|
| 5,705,907 A * | 1/1998 | Miyamori et al. | 318/599 |
| 5,747,956 A * | 5/1998 | Lamm | 318/599 |
| 5,898,284 A * | 4/1999 | Sasajima | 318/287 |
| 6,194,855 B1 | 2/2001 | Lochmahr et al. | |
| 6,407,520 B1 * | 6/2002 | Kleefeldt et al. | 318/162 |
| 6,552,506 B2 | 4/2003 | Kramer et al. | |
| 7,857,281 B2 * | 12/2010 | Pfaff | 251/129.04 |
| 2003/0011336 A1 * | 1/2003 | Kramer et al. | 318/466 |
| 2007/0067083 A1 * | 3/2007 | Shen et al. | 701/49 |

FOREIGN PATENT DOCUMENTS

| | | |
|---|---|---|
| DE | 4304960 A1 | 8/1994 |
| DE | 19618484 A1 | 8/1997 |
| DE | 10028041 A1 | 12/2001 |
| DE | 10346535 A1 | 5/2005 |
| DE | 102004057066 A1 * | 6/2006 |
| DE | 102005049869 A1 | 4/2007 |
| DE | 102006020627 A1 | 10/2007 |
| EP | 0740408 A2 | 10/1996 |

OTHER PUBLICATIONS

German Patent Office, German Patent Office Search Report for the underlying DE 10 2010 021 080.3, dated Aug. 24, 2012.

European Patent Office, International Search Report for the corresponding International Application No. PCT/EP2011/057999, mailed Sep. 17, 2012.

The International Bureau of WIPO, International Preliminary Report on Patentability for the corresponding International Application No. PCT/EP20111057999, mailed Dec. 13, 2012.

* cited by examiner

*Primary Examiner* — Shawki S Ismail
*Assistant Examiner* — Jorge L Carrasquillo
(74) *Attorney, Agent, or Firm* — Brooks Kushman P.C.

(57) ABSTRACT

A method for moving a movable element into a block position includes providing a supply voltage to an electric motor associated with the movable element for the motor to generate a motor current and drive the element with motor power dependent on the motor current in order to move the element along a path. Upon the element being moved into a block position of the path, the supply voltage provided to the motor is controlled such that the motor current generated by the motor is continuously reduced over a time period to zero. For instance, the supply voltage is pulse-width modulated at a decreasing pulse duty ratio over the time period such that the motor current generated by the motor is continuously reduced over the time period to zero.

14 Claims, 1 Drawing Sheet

US 8,803,463 B2

METHOD FOR MOVING AN ELEMENT, WHICH IS DRIVEN BY AN ELECTRIC MOTOR INSIDE A PREDETERMINED MOVEMENT SECTION BETWEEN TWO BLOCK POSITIONS EACH FORMED AS A LIMIT STOP, INTO A BLOCK POSITION

CROSS-REFERENCE TO RELATED APPLICATIONS

This application is a continuation of International Application No. PCT/EP2011/057999, published in German, with an International filing date of May 17, 2011, which claims priority to DE 10 2010 021 080.3, filed May 19, 2010; the disclosures of which are incorporated in their entirety by reference herein.

TECHNICAL FIELD

The present invention relates to a method for moving an element driven by an electric motor along a predefined path of motion between two block positions into either block position.

BACKGROUND

Such methods are used, for instance, to operate a variable-speed drive for moving a movable element such as a window pane, a sliding roof, a seat, etc., of a vehicle. The element is movable along a predefined path of motion between two block positions. Each block position is formed as a limit stop. The drive includes an electric motor configured to drive the element with motor power in order to move the element along the path between and into the block positions.

As an example, the element is a window pane of a vehicle. The window pane is movable relative to a window frame of the vehicle along a predefined path of motion between two block positions. One of the block positions (i.e., the upper block position) defines the closed position of the window pane. The other block position (i.e., the lower block position) defines the opened position of the window pane. As such, each block position is a limit stop in that each block position defines respective end points of the path of motion. Further, any position of the window pane along the path between the closed and opened positions is an intermediate position of the window pane along the path.

A window-lifter drive having an electric motor is associated with the window pane. The drive is configured to drive the window pane with power from the motor in order to move the window pane along the path of motion. The drive is further configured to operate the motor to carry out a braking action of the motion of the window pane as the window pane is moved into either block position. The drive operates the motor to cause the braking action to be more pronounced in the case of the window pane moving into the lower block position that characterizes the opened position of the window pane. The drive operates the motor to provide the braking action in order to bring the window pane as smoothly as possible into a block position (i.e., a limit stop). The braking action prevents the window pane from bouncing back from a block position upon moving into the block position. The braking action also reduces spring-back of the mechanical force transmission between the window pane and the motor and reduces annoying impact noises that could lead a user to suspect a defect in the drive.

DE 196 18 484 A1 (corresponding to U.S. Pat. No. 6,194,855) describes a method for moving a window pane with power of a motor of a drive associated with the window pane. The method includes reducing the motor power to a minimal power level in order to decelerate the window pane as the window pane is approaching a block position. The motor power is gradually reduced to the minimal power level starting at a predetermined intermediate position of the window pane along the path of motion away from a block position. The window pane is then retracted (i.e., moved) into the block position with the minimal remaining power of the motor. Due to the presence of a window seal on the upper-side of the window frame, such a procedure is generally not provided during retraction of the window pane into the upper block position as the seal causes a deceleration of the motion of the window pane during the closing process of the window pane.

Both during an application of this method for retracting the window pane into the lower blocked position as well as by the retraction that decelerates the entry of the window pane into the window seal in the upper block position, bursts of noise that may be experienced as disturbing from the user side could occur. Moreover, the deceleration process in the first case of the opening process of the window pane requires a time interval that is relatively long such that the braking action of the window pane is perceivable by a user.

SUMMARY

An object of the present invention includes moving a movable element into a block position in which movement of the element is decelerated as the element is moved into the block position with the deceleration of the element occurring without a perceived delay of the movement of the element into the block position and/or without disturbing noise being generated by the movement of the element into the block position.

Another object of the present invention includes moving a movable element with power from an electric motor in which the motor is operated to reduce the motor power in order to decelerate the element as the element is moved into a block position with the deceleration of the element occurring without a perceived delay of the movement of the element into the block position and/or without disturbing noise being generated by the movement of the element into the block position.

In carrying out at least one of the above and other objects, the present invention provides a method for moving a movable element into a block position. The method includes providing a supply voltage to an electric motor associated with the movable element for the motor to generate a motor current and drive the element with motor power dependent on the motor current in order to move the element along a path. Upon the element being moved into a block position of the path, the supply voltage provided to the motor is controlled such that the motor current generated by the motor is continuously reduced over a time period to zero.

In an embodiment, the supply voltage provided to the motor is pulse-width modulated at a decreasing pulse duty ratio over the time period such that the motor current generated by the motor is continuously reduced over the time period to zero.

Further, in carrying out at least one of the above and other objects, the present invention provides a system having an electric motor associated with an element movable along a path, a power supply for providing a supply voltage to the motor for the motor to generate a motor current and drive the element with motor power dependent on the motor current in order to move the element along the path, and a controller. The controller is configured to control the supply voltage provided to the motor such that the motor current generated by the motor is continuously reduced over a time period to zero upon the element being moved into a block position of the path.

Embodiments of the present invention are directed to moving a movable element such as a window pane, a sliding roof, an adjustable seat, etc., of a vehicle into a block position. The element is movable along a predefined path of motion between two mechanically-defined block positions. Each block position is formed as a limit stop. A drive having an electric motor is configured to drive the element with power of the motor in order to move the element along the path of motion and into either block position. The method includes operating the motor to carry out a deceleration of the motion of the element (i.e., a braking action of the element) as the element is moved into one of the block positions in order to bring the element smoothly into the limit stop corresponding to the block position. When the element is being moved into the block position, the method further includes continuously reducing the motor current of the motor over a preset time period to zero after the element reaches the block position. The motor current is continuously reduced to zero over the preset time period by pulse-width modulated (PWM) switching of the supply voltage of the motor at a decreasing pulse-pause ratio (i.e., a decreasing pulse duty ratio) over the preset time period.

Embodiments of the present invention achieve at least one of the above and other objects in that after reaching a block position during retraction of the element into the block position pulse-width modulated (PWM) switching of the power supply of the motor using a decreasing pulse duty ratio such that the motor current is continuously reduced over a prescribed time interval to zero is carried out In an embodiment, the movable element is a window pane. The window pane is movable relative to a window frame along a predefined path of motion between two block positions. One of the block positions (i.e., the upper block position) defines the closed position of the window pane. The other block position (i.e., the lower block position) defines the opened position of the window pane. A window seal is present on the upper-side of the window frame which corresponds to the upper block position. The motor is operated to provide reduced motor to carry out a deceleration of the motion of the window pane during retraction of the window pane into the lower block position. During retraction of the window pane into the lower block position with reduced motor power, as well as during retraction of the window pane into the upper block position that is decelerated by the window seal, mechanical stresses can build in the motor-transmission unit. Such mechanical stresses can build in the motor-transmission unit due to operation of the motor up to shutoff after detection of the block position, which can be relieved abruptly and noisily when shutting the motor off.

Because of the continuous reduction of the motor current over a prescribed time interval according to embodiments of the present invention, instead of a sudden switching off process, a gradual reduction of the motor power occurs, which acts on the mechanically stressed system. The mechanical motor-transmission system thereby relaxes slowly rather than abruptly, which gives rise to a significant reduction in noise.

In a first exemplary embodiment, the pulse-width modulated switching of the supply voltage of the motor occurs at a frequency greater or equal to 15 kHz, and preferentially 20 kHz. The pulse-to-pause ratio (i.e., pulse duty ratio) is thereby reduced continuously, advantageously according to a linear function of time, over a time interval between 50 and 200 milliseconds, and preferentially over a time interval of 100 milliseconds from 100% to 0%.

A method in accordance with embodiments of the present invention is suitable for operating an electrical adjusting mechanism for opening and closing a movable member such as a window pane, a sliding roof, a seat, etc., of a vehicle. For example, during operation of an electrical adjusting mechanism to actuate a window pane, the method can be used to enable the window pane to be retracted into the lower blocked position with as little noise as possible. The detection of position that is needed in such an application is advantageously carried out by an evaluation of the current ripple contained in the motor current. It is also possible to use a sensor-based position detector such as one employing a Hall sensor.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As indicated above, embodiments of the present invention are directed to a method for controlling an electric motor configured to drive a movable element with motor power in order to move the element. As an example, the element is a window pane. The window pane is movable along a predefined path of motion between first and second block positions and into either block position. The motor is operated to carry out a deceleration of the motion of the window pane as the window pane is moved into one of the block positions. For instance, the motor power is reduced to a minimal power level upon the window pane reaching an intermediate position adjacent a block position as the window pane is moving towards the block position. Upon the window pane being moved into the block position, the motor is operated such that the motor current is continuously reduced over a preset time period to zero. As a result, no motor current is present at the end of the preset time period. The motor current is continuously reduced to zero over the preset time period by pulse-width modulated (PWM) switching of the supply voltage of the motor at a decreasing pulse duty ratio.

Figure 1:
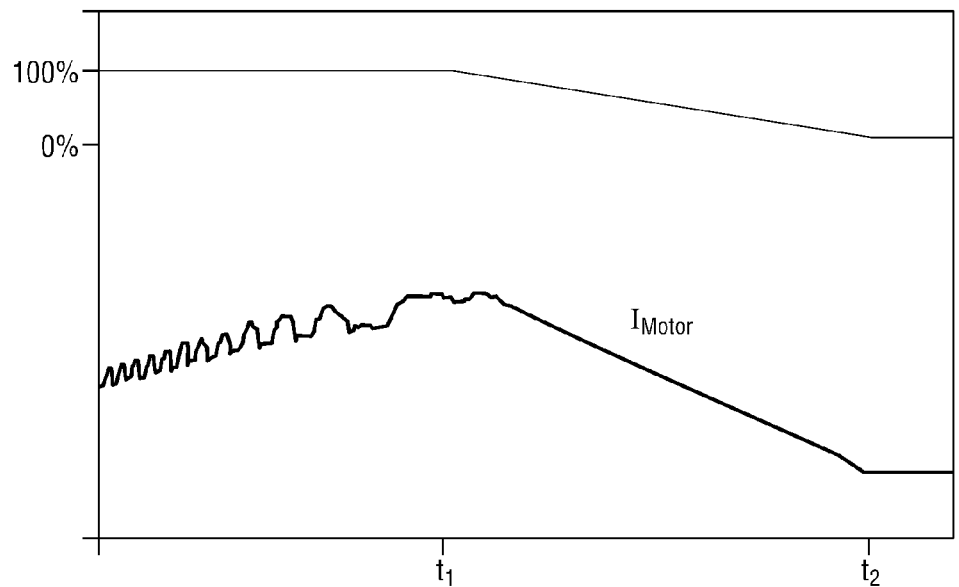
FIG. 1 illustrates a graph indicative of operation of motor control during when a movable element is being moved into a block position in accordance with an embodiment of the present invention.

Referring now to FIG. 1, a graph indicative of operation of motor control during when a movable element such as a window pane is being moved into a block position in accordance with an embodiment of the present invention is shown. The graph includes an upper plot and a lower plot. The lower plot, labeled "$I_{Motor}$", represents the analog motor current signal $I_{Motor}$ of the motor as a function of time. The upper plot represents the control signal for pulse-width modulated (PWM) control of the motor over time.

The upper plot representing the PWM control of the motor is indicative of the pulse-duty cycle of the supply voltage of the motor. The pulse-duty cycle, i.e., the pulse-to-pause ratio, is the ratio of the switched-on time and switched-off time of the supply voltage of the motor. As shown in the upper plot of the graph of FIG. 1, the pulse-duty cycle may have a value between and including 100% and 0%. At the 100% pulse-duty cycle, the motor is continuously supplied with its full operating voltage by the supply voltage of the motor. At the 0% pulse-duty cycle, the motor is not connected with the supply voltage of the motor and consequently no current flows through the motor (i.e., the motor current is zero). At a pulse-duty cycle falling between 100% and 0%, the motor is periodically supplied by the supply voltage of the motor with the switched-on/switched-off periodicity dependent on the fractional percentage of the pulse-duty cycle. Likewise, the motor current is at a value dependent on the fractional percentage of the pulse-duty cycle.

The pulse-duty cycle of the supply voltage of the motor is at 100% while the window pane is being driven with motor power to move along the predefined path of motion between the block positions. Upon the window pane being moved into a block position, the pulse-duty cycle of the supply voltage of the motor is controlled such that the motor current is continuously reduced over a preset time period to zero. In particular, the pulse-duty cycle of the supply voltage of the motor is continuously decreased in a linear manner over the preset time period (i.e., a decreasing pulse-duty ratio) as shown by the upper plot of the graph of FIG. 1. Consequently, the motor current ($I_{motor}$) is continuously decreased in the linear manner over the preset time period to zero current as shown by the lower plot of the graph of FIG. 1.

In greater detail, the retraction of the window pane into a block position by the method in accordance with an embodiment of the present invention is as follows. A determination is made that the window pane is located in the blocked position at the instant of time $t_i$ at which the appropriate current ripple superimposed on the motor current signal $I_{Motor}$ is detected. This determination may be made for instance because a prescribed maximum interval was exceeded for the distance between two neighboring current ripples.

In turn, the continuous operation of the supply voltage of the motor is discontinued and pulsing (i.e., pulse-duty cycle control) of the supply voltage of the motor is initiated. The pulse-duty cycle control entails switching on and off the operating voltage of the motor at a frequency of 20 kHz over a time interval of 100 msec. Within the scope of a pulse-width modulation, the pulse-to-pause ratio (i.e., the ratio between the switched-on time and the switched-off time of the supply voltage of the motor) is reduced according to a linear function from 100% at time t1 to 0% at time $t_2$. From the shape of the motor current signal $I_{Motor}$ between the times $t_1$ and $t_2$ shown in the lower plot of the graph of FIG. 1, it can be determined that the motor current also decreases approximately linearly from its maximum value to the null value.

Figure 2:
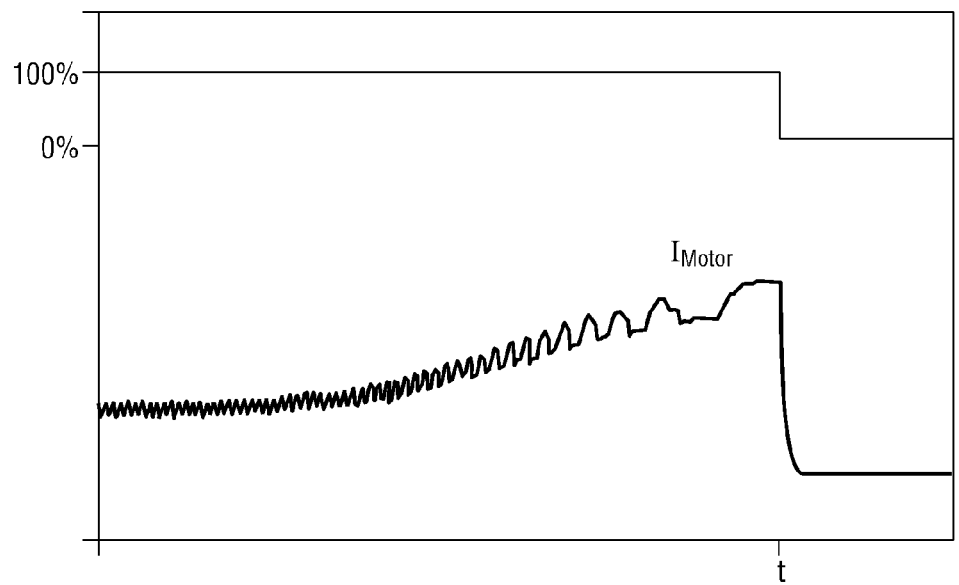
FIG. 2 illustrates a graph indicative of operation of motor control during when a movable element is being moved into a block position in accordance with the background art.

Referring now to FIG. 2, with continual reference to FIG. 1, a graph indicative of operation of motor control during when a movable element such as a window pane is being moved into a block position in accordance with the background art is shown. Again, the graph of FIG. 2 includes an upper plot and a lower plot. The lower plot, labeled "$I_{Motor}$", represents the analog motor current signal $I_{Motor}$ as a function of time. The upper plot represents the control signal for activation of the motor over time. Upon the window pane being detected to be in the block position, the continuous feed of the motor at its full operating voltage, which had been in effect until that time, is immediately terminated. That is, the operating voltage of the motor is reduced abruptly to zero at the time t when it is detected that the window pane is in the block position. Hence, the motor current is reduced abruptly to zero current. Again, the determination that the window pane is in the block position may be detected from current ripple superposed on the shape of the motor current signal that is indicative of the window pane being located in the block position.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for moving a movable window pane into a block position of a path, the method comprising:
   providing a supply voltage having a pulse duty ratio of 100% to an electric motor associated with the movable window pane for the motor to generate a motor current and drive the window pane with motor power dependent on the motor current in order to move the window pane along the path while the window pane is out of the block position of the path; and
   upon the window pane being moved into the block position of the path, in lieu of immediately terminating the supply voltage provided to the motor upon the window pane being moved into the block position, immediately pulse-width modulating the supply voltage provided to the motor at a decreasing pulse duty ratio from 100% to 0% over a time period commencing upon the window pane being moved into the block position such that the motor current generated by the motor is continuously reduced over the time period while the window pane is in the block position to zero.

2. The method of claim 1 wherein:
   the pulse duty ratio of the pulse-width modulation of the supply voltage provided to the motor is decreased linearly over the time period such that the motor current generated by the motor decreases linearly over the time period.

3. The method of claim 2 wherein:
   the time period is between 50 and 200 milliseconds.

4. The method of claim 1 wherein:
   the pulse-width modulation of the supply voltage provided to the motor occurs at a frequency of at least 15 kHz.

5. The method of claim 1 further comprising:
   reducing the supply voltage to the motor as the window pane is being moved into the block position such that the motor power for driving the window pane is reduced whereby motion of the window pane is decelerated as the window pane is being moved into the block position.

6. The method of claim 1 further comprising:
   detecting when the window pane is moved into the block position by monitoring current ripples of the motor current.

7. The method of claim 1 wherein:
the block position is a limit stop.

8. A system comprising:
an electric motor associated with a window pane movable along a path having a block position;
a power supply for providing a supply voltage having a pulse duty ratio of 100% to the motor for the motor to generate a motor current and drive the window pane with motor power dependent on the motor current in order to move the window pane along the path while the window pane is out of the block position of the path; and
a controller configured to, upon the window pane being moved into the block position of the path, immediately pulse-width modulate the supply voltage provided to the motor at a decreasing pulse duty ratio from 100% to 0% over a time period commencing upon the window pane being moved into the block position, in lieu of immediately terminating the supply voltage provided to the motor upon the window pane being moved into the block position, such that the motor current generated by the motor is continuously reduced over the time period while the window pane is in the block position to zero.

9. The system of claim 8 wherein:
the controller is further configured to linear decrease the pulse duty ratio of the pulse-width modulation of the supply voltage provided to the motor over the time period such that the motor current generated by the motor decreases linearly over the time period.

10. The system of claim 9 wherein:
the time period is between 50 and 200 milliseconds.

11. The system of claim 8 wherein:
the controller is further configured to pulse-width modulate the supply voltage provided to the motor at a frequency of at least 15 kHz.

12. The system of claim 8 wherein:
the controller is further configured to reduce the supply voltage to the motor as the window pane is being moved into the block position such that the motor power for driving the window pane is reduced whereby motion of the window pane is decelerated as the window pane is being moved into the block position.

13. The system of claim 8 wherein:
the controller is further configured to detect when the window pane is moved into the block position by monitoring current ripples of the motor current.

14. The system of claim 8 wherein:
the block position is a limit stop.

* * * * *